(12) United States Patent
Wentz, Jr.

(10) Patent No.: US 8,562,013 B1
(45) Date of Patent: Oct. 22, 2013

(54) RECEIVER HITCH FOR AUTOMOTIVE VEHICLES

(75) Inventor: Theodore H. Wentz, Jr., Villanova, PA (US)

(73) Assignee: Quadratec, Inc., West Chester, PA (US)

( * ) Notice: Subject to any disclaimer, the term of this patent is extended or adjusted under 35 U.S.C. 154(b) by 0 days.

(21) Appl. No.: 13/599,370

(22) Filed: Aug. 30, 2012

(51) Int. Cl.
*B60D 1/52* (2006.01)

(52) U.S. Cl.
USPC .............................. 280/495; 280/504; 280/500

(58) Field of Classification Search
USPC .................. 280/495, 497, 501, 500, 504, 505
See application file for complete search history.

(56) References Cited

U.S. PATENT DOCUMENTS

| | | | | |
|---|---|---|---|---|
| 5,102,156 A * | 4/1992 | Fink et al. | ...................... | 280/495 |
| 6,089,431 A * | 7/2000 | Heyworth | ...................... | 224/521 |
| 6,234,512 B1 * | 5/2001 | Bettenhausen | ............ | 280/491.1 |
| 6,502,845 B1 * | 1/2003 | Van Vleet | ................... | 280/491.1 |
| 6,685,212 B1 * | 2/2004 | Penlerick et al. | ............. | 280/495 |
| 6,742,799 B1 * | 6/2004 | Hansen | .......................... | 280/495 |
| 6,814,366 B2 * | 11/2004 | McCoy et al. | ................ | 280/495 |
| 8,276,932 B2 * | 10/2012 | Columbia | ...................... | 280/511 |
| 2002/0101057 A1 * | 8/2002 | Hermann et al. | ............. | 280/504 |
| 2003/0011169 A1 * | 1/2003 | McCoy et al. | ............. | 280/491.2 |

* cited by examiner

*Primary Examiner* — Tashiana Adams
(74) *Attorney, Agent, or Firm* — RatnerPrestia

(57) ABSTRACT

A receiver hitch includes a plurality of bores. Thus, an accessory is attached to the receiver hitch at two points of contact by being coupled to the plurality of bores. In an exemplary embodiment of the present invention, at least one of the bores is positioned off center relative to the receiver hitch or the vehicle. In a further exemplary embodiment of the present invention, the receiver hitch can include a trailer hitch receiving bore positioned on a centerline of the receiver hitch. In this exemplary embodiment, a trailer is attached to the trailer hitch receiving bore (through, for example, a ball mount) while an accessory is attached to one of the other bores. In yet a further exemplary embodiment of the present invention, there is included at least one bore that is off centered relative to the receiving hitch.

15 Claims, 7 Drawing Sheets

RECEIVER HITCH FOR AUTOMOTIVE VEHICLES

FIELD

The present subject matter is directed toward a receiver hitch for automotive vehicles.

BACKGROUND

A conventional receiver hitch is typically mounted on the rear of an automotive vehicle. The receiver hitch can be mounted to the vehicle using several methods. In one method, the receiver hitch is permanently attached to the rear of the vehicle. In another method, the receiver hitch is bolted to the rear of the vehicle and can be removed if desired.

Conventional receiver hitches typically include a receiver opening. The receiver opening is typically a square shaped bore and the dimensions of the bore are typically two inches by two inches. Other sizes are also known, including 1¼"× 1¼". The bore is typically positioned so that when the receiver hitch is coupled to the vehicle, the bore is centered relative to the vehicle. It is possible to use the receiver hitch and its bore for several purposes.

In one scenario, the receiver hitch is used to tow a trailer. Thus, for example, a ball mount is inserted into the bore. The ball mount includes a shaft that is inserted into the bore. At the other end of the shaft, a metal "ball" is situated. The trailer is then attached to the ball. The advantage of having a ball is that as the automotive vehicle goes around a turn, the trailer is able to rotate about the ball. This allows for smooth motion of the trailer as the vehicle and the trailer are going around the turn.

In another scenario, the receiver hitch is used to attach accessories to the rear of the automotive vehicle. There are many types of accessories that are attached to the rear of an automotive vehicle in this manner. Exemplary accessories are used to carry various items at the rear of the automotive vehicle. Exemplary accessories include bicycle racks, ski racks, boat racks, etc. Other types of accessories are merely decorative. Such exemplary accessories include flashing lights, figurines, etc. Thus, the accessory includes a shaft that is inserted into the bore and is thus attached to the receiver hitch. At the other end of the shaft, there may be racks, platforms, or the previously mentioned decorative members.

The bore typically includes one or more opening along both of its sides. The shaft of the accessory that is inserted into the bore includes matching openings along its sides. To secure the shaft to the bore, a pin may be inserted through the opening to secure the shaft to the bore. The pin may be for example, a pin that is inserted into the openings. The pin may include, for example, a spring loaded lock at its end. Alternatively, a threaded member may be inserted into the opening and a nut like member may be screwed onto the threaded member at the point where it emerges from the openings. In this way, the shaft of the accessory is secured to the bore of the receiver hitch.

SUMMARY

A receiver hitch includes a plurality of bores. Thus, an accessory is attached to the receiver hitch at two points of contact by being coupled to the plurality of bores. In an exemplary embodiment of the present invention, at least one of the bores is positioned off center relative to the receiver hitch or the vehicle. In a further exemplary embodiment of the present invention, the receiver hitch can include a trailer hitch receiving bore positioned on a centerline of the receiver hitch. In this exemplary embodiment, a trailer is attached to the trailer hitch receiving bore (through, for example, a ball mount) while an accessory is attached to one of the other bores. In yet a further exemplary embodiment of the present invention, there is included at least one bore that is off centered relative to the receiving hitch.

DESCRIPTION OF THE ACCOMPANYING DRAWINGS

DETAILED DESCRIPTION

As described above, it is well known in the prior art for the receiver hitch to include only one bore. The inventor of the present application has determined that there are various disadvantages to this configuration.

One disadvantage of the prior art configuration is that if there is only one bore, then it is difficult to attach more than one item to the automotive vehicle. Assume a ball mount has been inserted into the bore and it is then desired to use an accessory at the same time. For example, assume that it is desired to tow a trailer and to simultaneously use an accessory such as a rack to hold bicycles. If the single bore is occupied with the ball mount, then there is nowhere for the accessory to be attached to the receiver hitch (i.e. the single bore is occupied and there are simply no more bores to accommodate the shaft of the accessory).

Another disadvantage of the prior art configuration is a lack of stability. When a rack is attached to the receiver hitch, it is attached to the receiver hitch through a single point of contact (i.e. the shaft of the rack is inserted into the single bore). Thus, all the weight of the rack is being suspended at one point (i.e. within the bore). This makes the rack subject to vibration and swaying as the vehicle is driven on the road.

Figure 1:
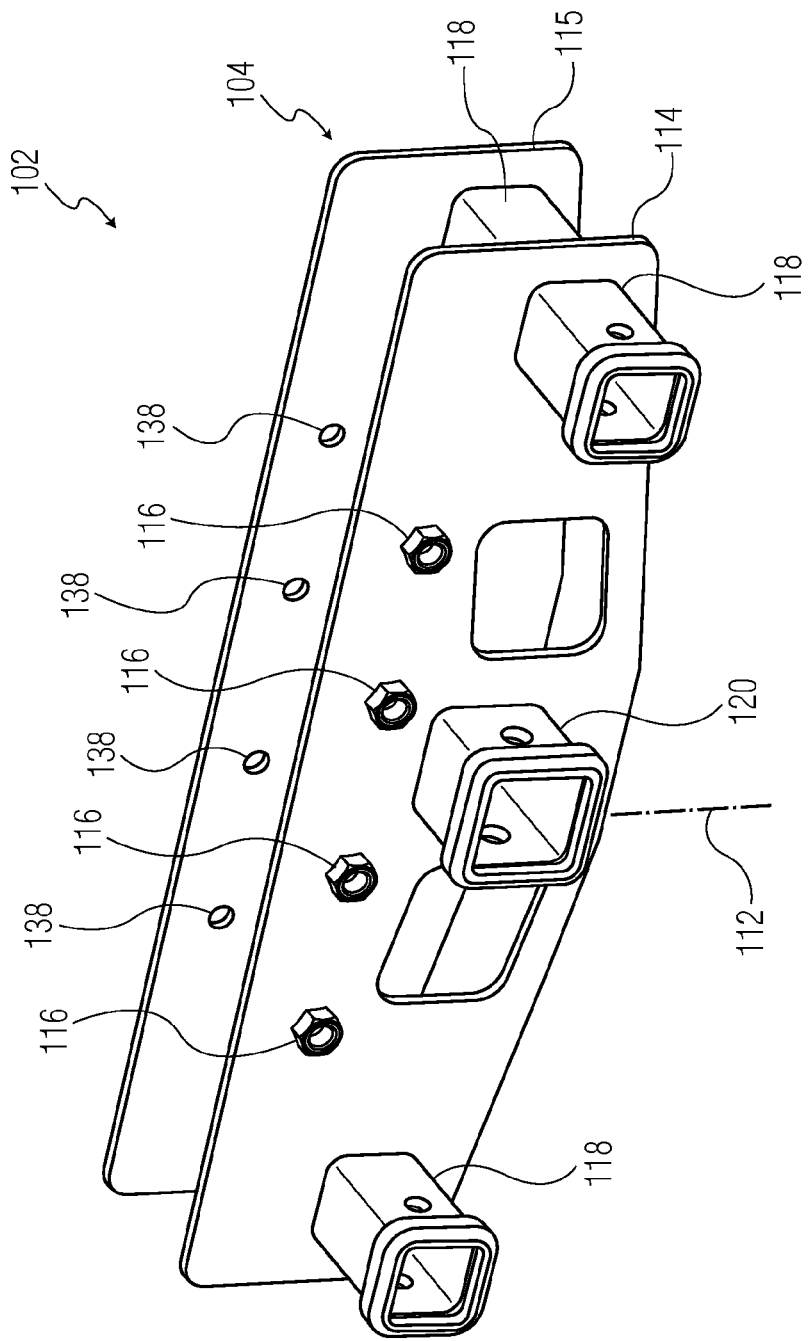
FIG. 1 shows a perspective view of a receiver hitch in accordance with an exemplary embodiment of the present subject matter.
Figure 2:
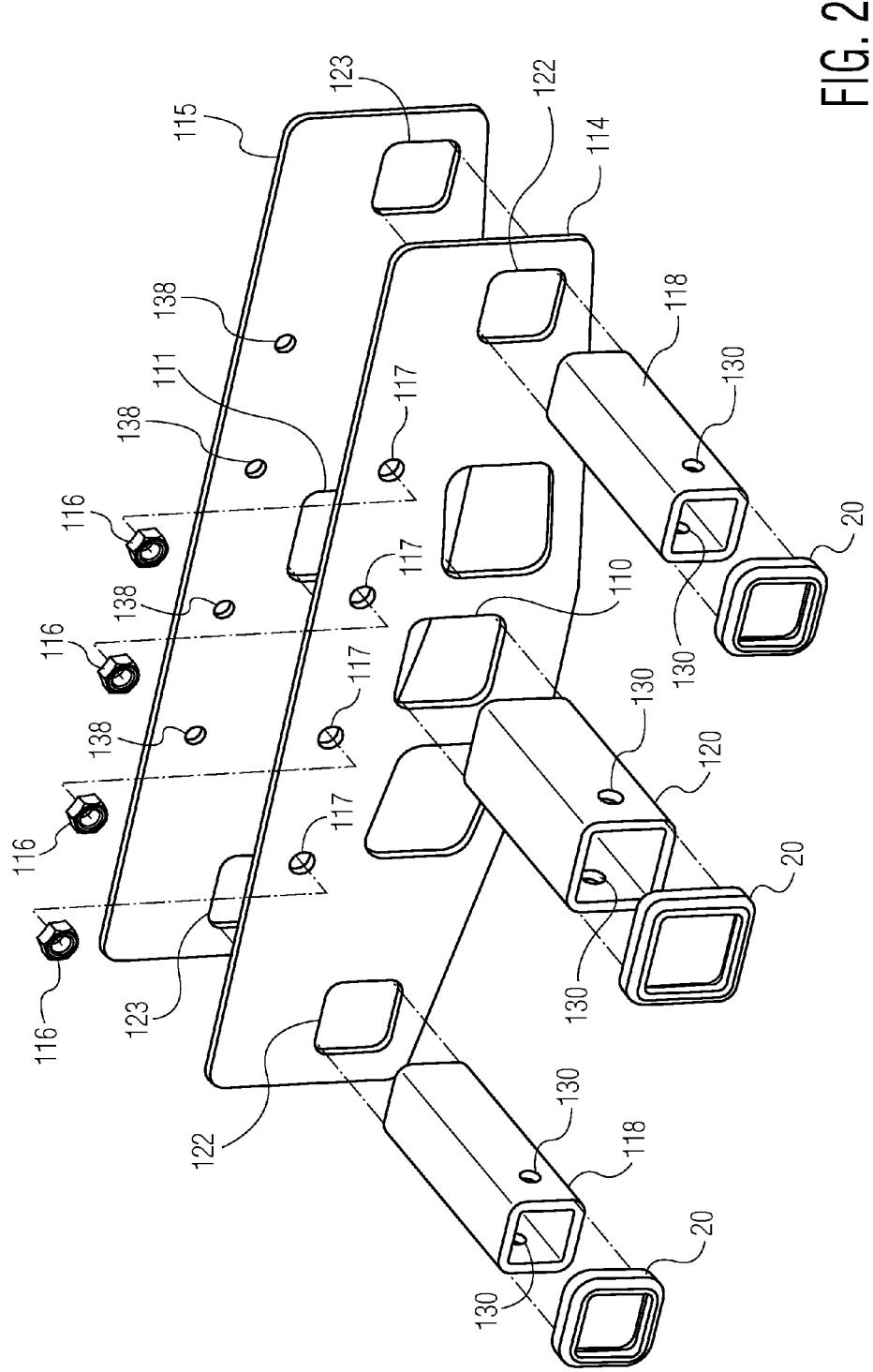
FIG. 2 shows an exploded view of the exemplary receiver hitch of FIG. 1.

A first embodiment of the present subject matter is shown in FIGS. 1 and 2. Receiver hitch 102 includes a mount 104 for coupling the receiver hitch 102 to a vehicle 106 (shown in FIG. 3) and bore 118 (i.e. an attachment member). The receiver hitch may include front flange 114 and rear flange 115. In an exemplary embodiment of the present invention, front flange 114 and rear flange 115 may be made of a material such as steel, or another material sufficient to withstand the forces resulting from attaching accessories and a trailer to the receiver hitch. If steel is used, the gauge of the steel is selected to provide the receiver hitch with sufficient strength for the particular application. Bore 118 may be positioned off center of a centerline of front flange 114 of mount 104. A plurality of threaded fasteners 138 are located adjacent to front flange 114. These fasteners allow bolts (not shown) to be secured to mount 104 in order to attach receiver hitch 102 to the rear of the automotive vehicle. The bolts extend through openings 117, 118 and thus "engage" a suitable rear member (i.e. the frame) of the vehicle.

Bore 118 is secured to front flange 114 via a weld or, in the case of casting, during creation of front flange 114. Bore 118 is secured to front flange 114 at opening 122. In an exemplary embodiment of the present invention, bore 118 has an opening width of about one and a half inches. It is understood, however, that other dimensions may be used. Bore 118 is not limited to any particular cross-sectional shape; it can be rectangular, oval, circular, triangular, oblong, polygonal, etc. An optional end cap 20 is located at an end of bore 118. End cap 20 prevents galling and mushrooming of bore 118. It is understood that rear flange 115 may be optional but is preferred in the disclosed exemplary embodiment for strengthening. Opening 123 of rear flange 115 may correspond with opening 122 of front flange 114. Bore 118 may extend through opening 122 in front flange 114 to (or even beyond) opening 123 in rear flange 115. Bore 118 may be secured to rear flange 115 via welding or casting.

It is understood that the embodiment illustrated in FIGS. 1 and 2 is merely exemplary for certain types of automotive vehicles and the actual configuration may change depending upon the particulars of the automotive vehicle which is being used in conjunction with the present invention. There are many makes and models of automotive vehicles and each automotive vehicle will have different installation requirements. For example, while FIGS. 1 and 2 include front flange 114 and rear flange 115, there are some installation scenarios in which only one or neither flange is needed. A further example is described below. Also, while FIGS. 1 and 2 illustrate three bores (two bores 118 and one receiving bore 120), it is understood that an exemplary embodiment of the present invention can be implemented with as few as two bores as further explained below. In addition, while FIGS. 1 and 2 illustrate a bolt/nut attachment method to the vehicle, it is understood that other attachment methods may be used as described below.

Figure 3:
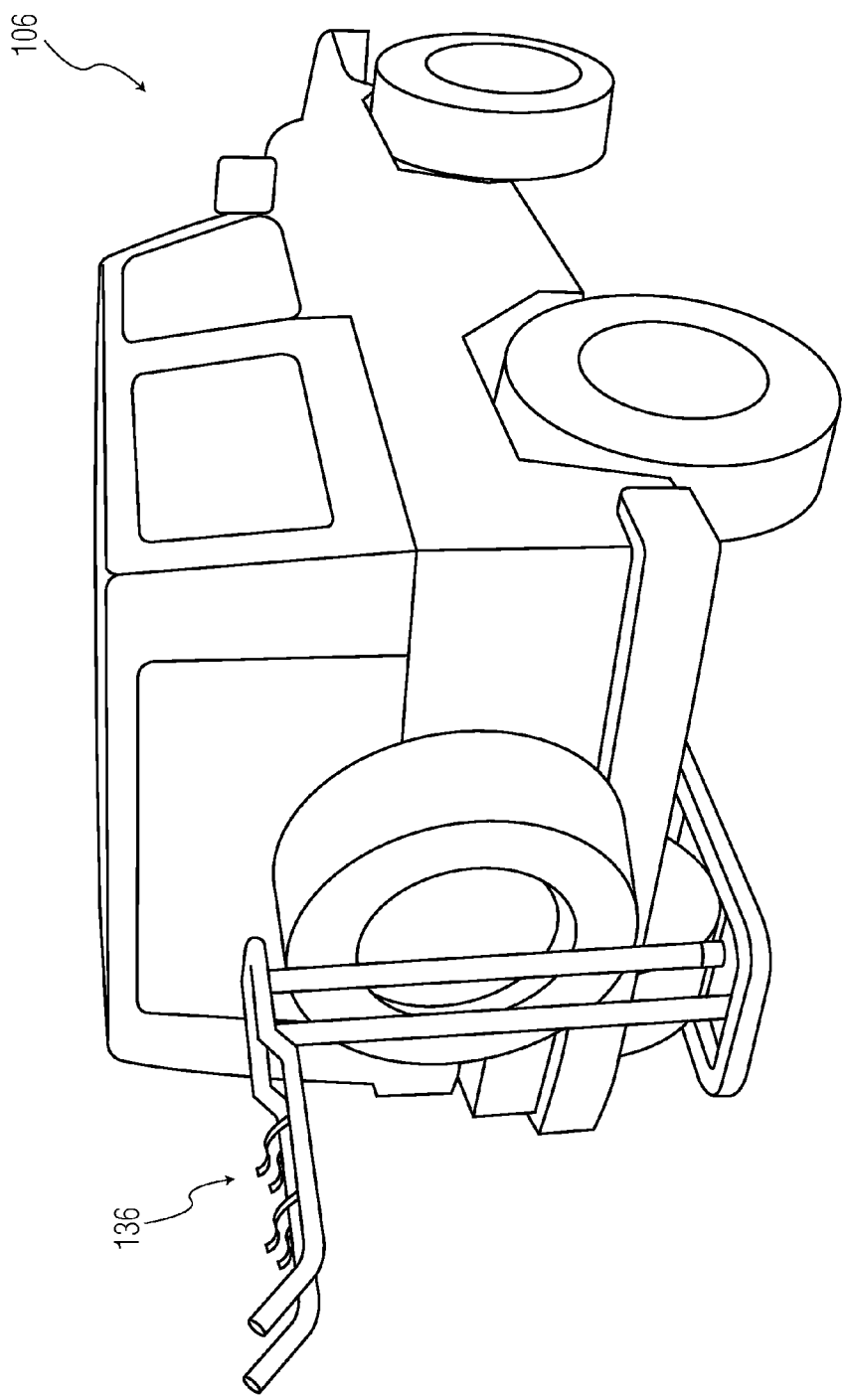
FIG. 3 shows an exemplary accessory coupled to the receiver hitch.

Any number of different types of accessories can be attached to receiver hitch 102. As shown in FIG. 3, an exemplary bike rack 136 is shown. Other exemplary accessories are any of an over-the-roof rack, a bike carrier and a ski rack. The accessories include shafts (described below) for engaging bores 118 in receiver hitch 102.

To account for the traditional trailer hitch function, receiver hitch 102 may optionally include trailer hitch receiving bore 120 (which may also be considered to be an attachment member). Trailer hitch receiving bore 120 is on centerline 112 of mount 104 (or is situated so that it is centered relative to the automotive vehicle). As shown, trailer hitch receiving bore 120 extends through opening 110. Trailer hitch receiving bore 120 is attached to front mount 114 through welding or other known manufacturing techniques (including being integrally formed with mount 104). If rear mount 115 is included, then trailer hitch receiving bore 120 may extend through opening 111. If rear mount 115 is included, then trailer hitch receiving bore is attached to rear mount 115 through welding or other known manufacturing techniques. Bores 118 can engage with an accessory while a full sized trailer is simultaneously attached to trailer hitch receiving bore 110 (directly or through an appropriate coupling as explained below).

Figure 4:
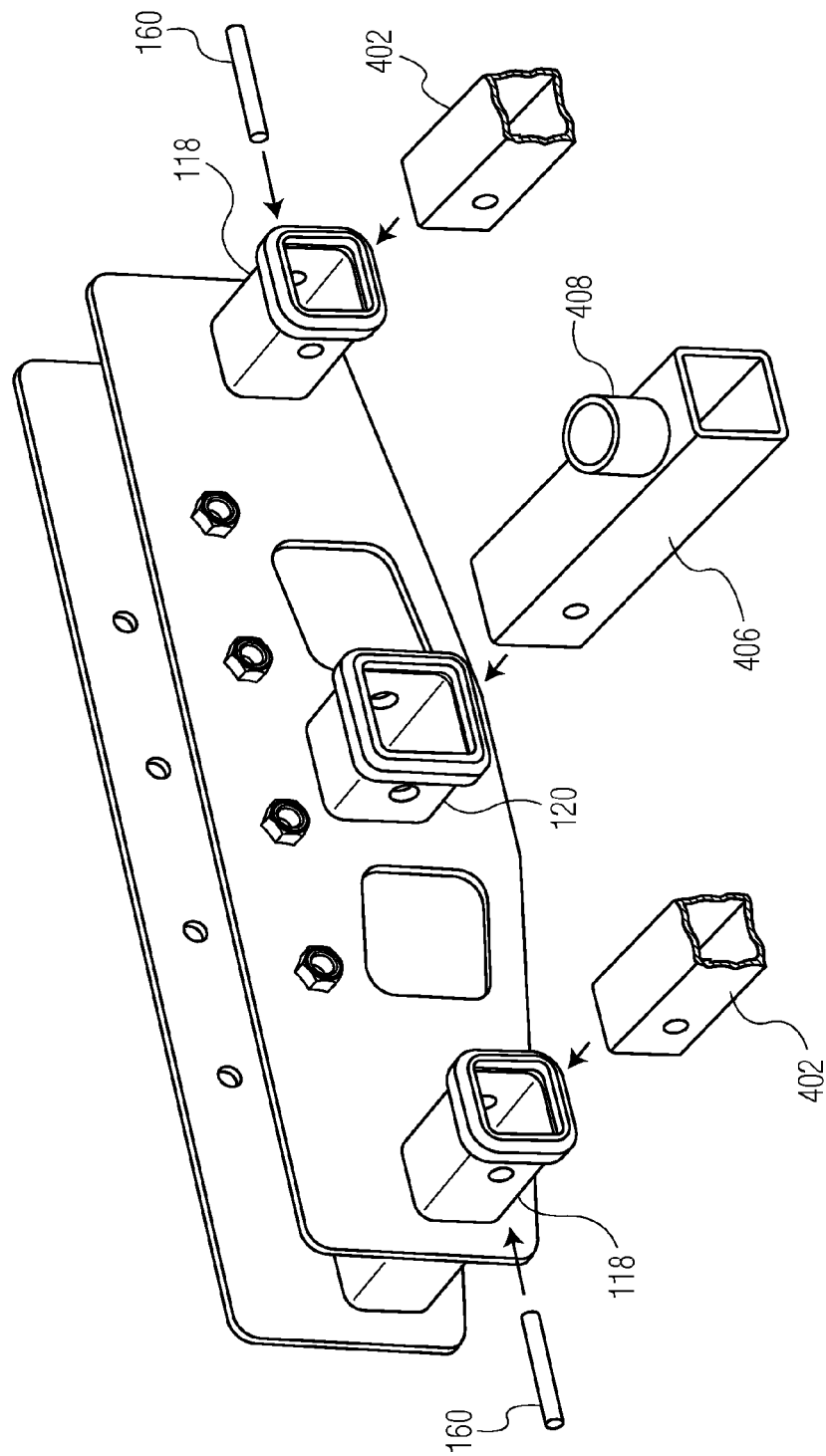
FIG. 4 shows a further exemplary embodiment of the present subject matter.

FIG. 4 illustrates how an accessory and/or a trailer are attached to receiver hitch 102. An accessory may include a plurality of shafts 402. Shafts 402 slide into bores 118 in order to attach the accessory to receiver hitch 102. If it is desired to also attach a trailer to receiver hitch 102, the trailer is attached to receiver hitch 102 via ball mount 406. As shown in FIG. 4, ball mount 406 includes shaft 404 and ball 408. Shaft 404 slides into bore 120 in order to attach ball mount 406 to receiver hitch 102. The trailer (not shown) is then attached to ball 408.

As is shown in FIG. 2, exemplary holes 130 are provided in the sides of bores 118, 120. These holes are for accommodating a pin 160 (i.e. an attachment structure), shown in FIG. 4, to hold accessory shafts 402 and/or ball hitch shaft 404 in place. Thus, accessory shafts 402 and/or ball hitch shaft 404 includes holes at respective positions that match the position of holes 130 in bores 118, 120. Pin 160 is thus inserted into holes 130 (and the holes in the sides of the shafts) to hold the shafts (and the accessories or ball mount) into place.

While pin 160 is illustrated as holding accessory shafts 402 and/or ball hitch shaft 404 in place, it is understood that the disclosure of pin 160 for performing this function is merely exemplary. Thus, any attachment structure is contemplated for holding accessory shafts 402 and/or ball hitch shaft 404 in place. Thus, the attachment structure may initially be separate from shafts 402, 404 or it may be integrated with shafts 402, 404, integrated with bores 118, 120 or integrated with both the shafts and the bores. The attachment structure may be situated at the locations shown in the exemplary figures, or at another location along (or at the ends of) bores 118, 120 or shafts 402, 404. The attachment structure can be a pin type structure, a threaded screw type structure, a spring loaded (or some other type of force loaded) structure, a male/female structure, or any other type of structure that results in shafts 402, 404 and bores 118, 120 (to the extent that the shafts and bores are present in the exemplary embodiment) being coupled together.

Again, it is noted that use of the invention with a trailer is optional. An accessory may be coupled to receiver hitch 102 without also towing a trailer.

In an exemplary embodiment of the present invention, bores 118 have a different cross sectional size or shape then the size or shape of bores 120. The purpose of making the size or shape different is so that a trailer cannot be coupled to receiver hitch 102 through bore 118. If a trailer is coupled (through a ball mount) to receiver hitch 102, it is desirable for the trailer (through the ball mount) to be coupled to receiver hitch 102 through trailer hitch receiving bore 120. In this embodiment, coupling of a trailer to receiver hitch 102 via bore 118 is not possible because bore 118 cannot accommodate the dimensions of a trailer ball hitch. In this manner, it is ensured that the trailer is pulled from the center of the automotive vehicle, which is a much safer way to pull a hitch than if the trailer is being pulled off center.

Figure 5A:
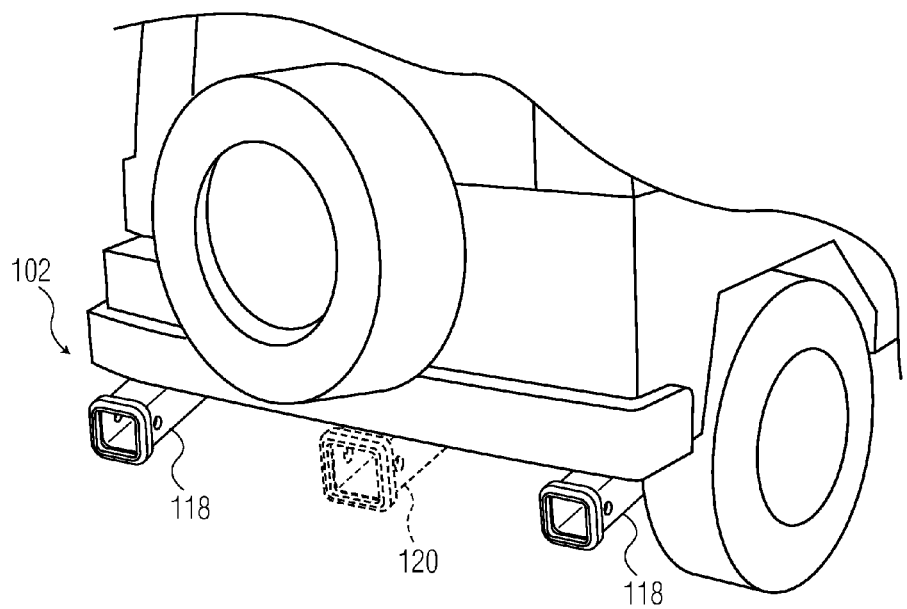
FIGS. 5A and 5B show further exemplary embodiments of the present subject matter.
Figure 5B:
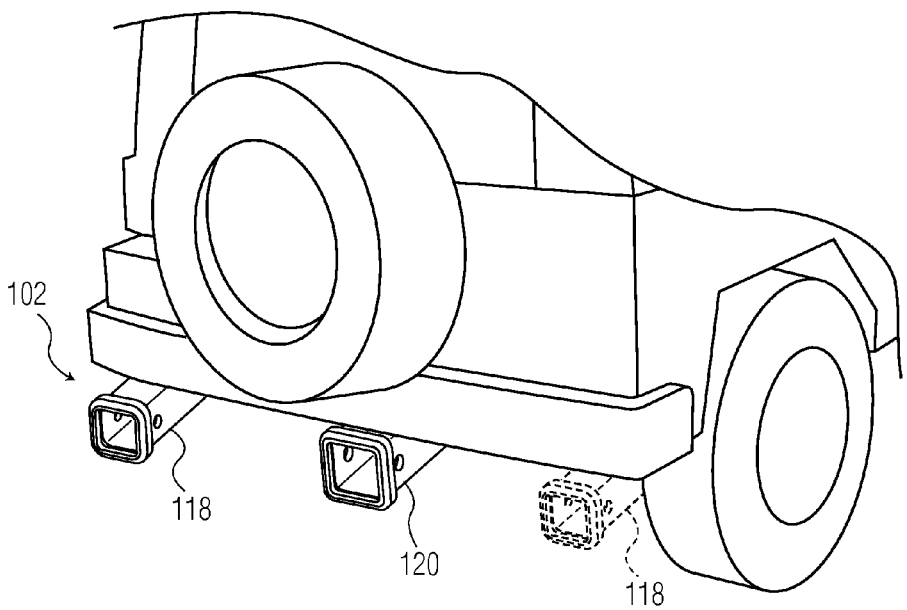

Further exemplary embodiments of the present invention are shown with respect to FIGS. 5A and 5B. As shown in these figures, bores 118 and 120 are mounted without the use of mounts 114 and 115. While one exemplary embodiment may include direct connection of bores 118, 120 to the vehicle chassis, an indirect connection to the vehicle chassis is also contemplated as being within the scope of the present invention. Thus, any configuration that permits bores 118 and 120 to be accessible from the rear (or possibly even the front) of the vehicle is understood as being within the scope of the invention. Also, FIG. 5A illustrates bore 120 as being optional while FIG. 5B illustrates (any) one of the bores 118 as being optional. What is contemplated is at least two bores accessible from the rear of the vehicle. Also, as shown in the figures, a space exists between any two bores that are included in an exemplary embodiment of the present invention. By use of the word "space" what is meant is that the two bores are separated from each other. Thus, the two bores may be, for example, side to side. In addition, there may be a distance between the two bores. Thus, the two bores may be next to each other or there may be a distance greater than zero inches between the two bores.

Figure 6:
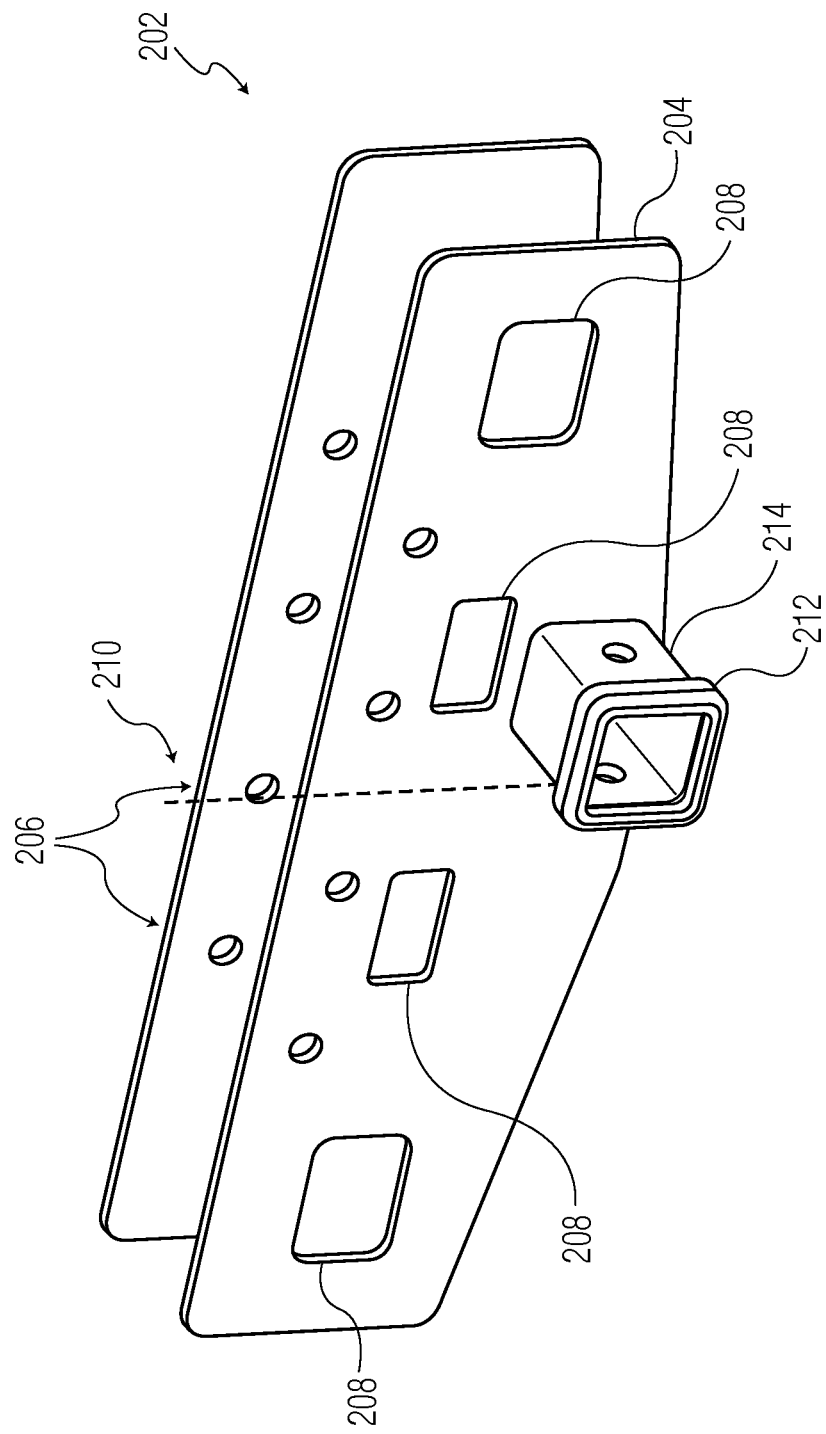
FIG. 6 shows a perspective view of a receiver hitch in accordance with a further exemplary embodiment of the present invention.

A further embodiment of the present subject matter is shown in FIG. 6. An assembly 202 includes a flange 204 having a plurality of receiving bores and a fastening mechanism 206 for fixing the tow hitch assembly 202 to a vehicle. None of the plurality of receiving bores 208 are on a centerline 210 of assembly 202.

This type of configuration is not necessarily conducive to towing a trailer as the draw bar would be off-center. However, towing a trailer is not impossible. Towing a trailer could be made possible through reconfiguring the geometry of the draw bar to account for the off-center placement of the trailer hitch receiving bore. Such a draw bar would be bent such that a ball mount that is connected to the draw bar is on a centerline of the tow hitch assembly.

Further, each of the plurality of receiving bores 208 has a respective size that is dissimilar to a size of any other receiving bore within the plurality of receiving bores 208. Receiver tubes can be added to the bores. To prevent a person from mistakenly inserting a draw bar into an accessory receiver tube, the diameters of the receiving bores should be smaller than a trailer hitch bore that would be included in the tow hitch assembly.

Figure 7:
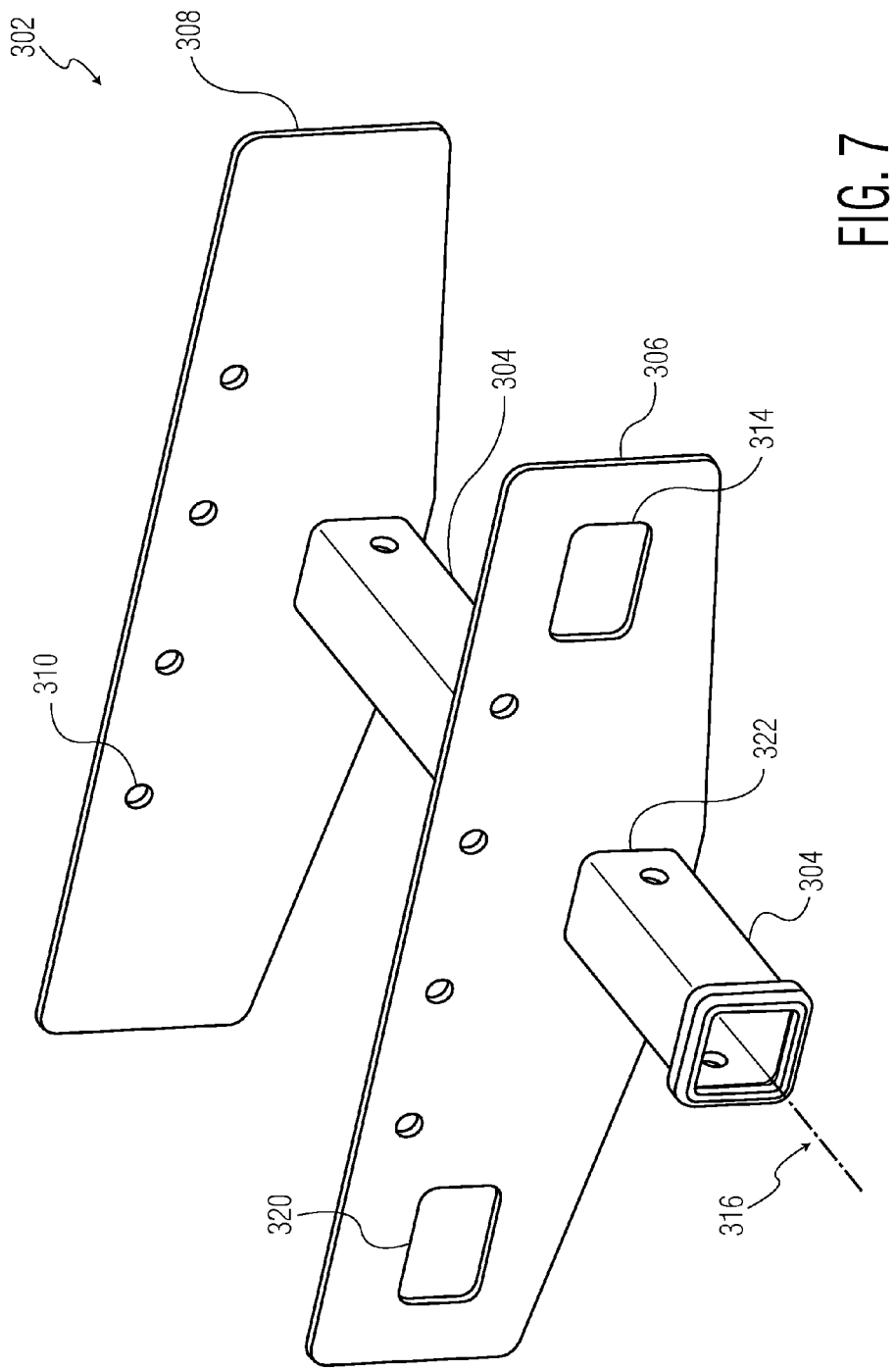
FIG. 7 shows another exemplary embodiment of the present invention.

In a further embodiment of the disclosed subject matter, the receiver hitch assembly is not required to include a trailer hitch draw bar on a centerline of the tow hitch. With reference to FIG. 7, in a receiver hitch assembly having a centerline spine 304, a forward flange 306 fixed to the centerline spine 304 via opening 322, a rearward flange 308 fixed to the centerline spine 304 and a fastener 310 located for securing receiver hitch 302 to a vehicle, the accessory bores and tubes can be in either of the forward or rearward flanges.

When in use, the forward flange 306 is positioned toward the rear of a vehicle and the rearward flange 308 is positioned ahead on the vehicle of the forward flange. Ideally, a male member (not shown) of an accessory would extend through both the forward flange 306 and the rearward flange 308. However, this extension is not required. In particular, in the case where an accessory receiver tube is added to the flange, the male member would extend into the accessory receiver tube as deep as the forward flange via opening 314 or 320 and be held in place by, for example, a cotter pin or some other securing means. Thus, the male member of the accessory would never contact the rearward flange 308. In the case where no accessory receiver tube is used, a male member of an accessory would extend through both flanges 306 and 308 and be held in place by a sufficient securing means. A combination of these configurations is also possible wherein a male member of an accessory would extend through both an accessory receiver tube, through the forward flange and through the rearward flange. The tube would extend either only from the forward flange, only between the forward flange and the rearward flange or both.

With further reference to FIGS. 1 and 2, the receiver hitch assembly of the present application can be added to a vehicle during the vehicle's manufacture or as an after-market item. Whether factory or after-market, the receiver hitch 102 connects to an underbody of the vehicle 106, the body of the vehicle or any other part of the vehicle that will not impede operation of the vehicle. To properly secure the assembly in place a plurality of fasteners (preferably, threaded or welded) can be added to the assembly's flange. Fasteners are not required, however, the assembly is weldable to a vehicle's frame or body.

The above embodiments have been described as the receiver hitch having "female" bores (attachment members) and the ball mount and accessories having "male" shafts that are inserted into the "female" bores. It is understood, however, that the entire configuration can be completely switched, by providing the receiver hitch with male members, and the ball mount and/or accessories having female members. In such an exemplary embodiment, the male members would extend from the receiver hitch and the ball mount and/or accessories would have female members that slide onto and around the male members extending from the receiver hitch.

It is understood to one of ordinary skill in the art that if receiver hitch 102 is being used to pull a trailer, then receiver hitch 102 is desirably of sufficient strength to perform that function. In such a situation, receiver hitch 102 preferably satisfies the requirements of SAE J684.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

It will be understood that many additional changes in the details, materials, steps and arrangement of parts, which have been herein described and illustrated to explain the nature of the invention, may be made by those skilled in the art within the principal and scope of the invention as expressed in the appended claims.

I claim:

1. A receiver hitch for coupling at least one object to a vehicle, said receive hitch comprising
a plurality of attachment members coupled to said vehicle, wherein a) one of said attachment members is a trailer bore which is separated from b) another of said attachment members;
a plurality of attachment structures, each of said attachment structures for securing said at least one object to said trailer bore or said another of attachment members;
wherein said another of said attachment members has a size and/or shape which prevents a shaft of said one object which conforms to size/shape of said trailer bore from being securable to said another of said attachment members
and wherein said shape of said another of said attachment members is non-circular.

2. A receiver hitch as recited in claim 1, said receiver hitch further comprising a mount for securing said plurality of attachment members to a rear of said vehicle.

3. A receiver hitch as recited in claim 1 wherein at least one of said attachment members is a bore facing towards a rear of the vehicle.

4. A receiver hitch as recited in claim 1, wherein each of said attachment members includes a respective bore facing towards a rear of the vehicle.

5. A receiver hitch as recited in claim 1, wherein said trailer bore is centered on the rear of the vehicle and said another of the attachment members is a further bore which is off center relative to the rear of the vehicle.

6. A receiver hitch as recited in claim 5 further comprising an end cap at an end of one of the trailer bore and the further bore for preventing galling and mushrooming of the accessory receiver tube.

7. A receiver hitch assembly comprising
a first attachment member centered relative to a rear of a vehicle, said first attachment member including an attachment structure for securing at least one object to said vehicle,
a second attachment member offcentered relative to said rear of said vehicle, said second attachment member including a further attachment structure for securing said at least one object to said vehicle,
said second attachment member has a size and/or shape which prevents a shaft of said one object which conforms to size/shape of said first attachment member from being securable to said second attachment member,
said shape of said second attachment member is non-circular,
wherein each of the first attachment member and the second attachment member is a male member or a female member.

8. A method of attaching an accessory to the rear of an automotive vehicle, the method comprising the steps of:
a) providing the accessory having an attachment member,
b) securing the attachment member to a further attachment member situated on the rear of the automotive vehicle, wherein the attachment member is one of male and female structures and the further attachment member is the other of male and female structures, the further attachment member spaced apart from a trailer bore on the rear of the vehicle;
wherein said further attachment member has a size/shape which prevents a shaft which conforms to size/shape of said trailer bore from being securable to said further attachment member
and wherein said shape of said further attachment member is non circular.

9. A method according to claim 8, further comprising the step of securing a trailer having wheels to the rear of the automotive vehicle.

10. A method according to claim 8, step b) includes the step of sliding said one of said male and female structures into the other of said male and female structures.

11. A method of attaching an accessory to the rear of an automotive vehicle according to claim 8 wherein the attachment member is attached off center relative to the rear of the automotive vehicle.

12. A receiver hitch according to claim 1, wherein said shape of said another of said attachment members is selected from the group consisting of rectangular, oval, triangular, oblong and polygonal.

13. A receiver hitch assembly according to claim 7, wherein said shape of said second attachment member is selected from the group consisting of rectangular, oval, triangular, oblong and polygonal.

14. A method according to claim 8, wherein said shape of said further attachment member is selected from the group consisting of rectangular, oval, triangular, oblong and polygonal.

15. A receiver hitch according to claim 1, wherein said trailer bore is centered relative to a rear of said vehicle.

* * * * *